Patented Oct. 11, 1949

2,484,258

UNITED STATES PATENT OFFICE 2,484,258

HYDROCARBON CRACKING CATALYST AND PROCESS

Glenn M. Webb, Western Spring, and Reno W. Moehl, Brookfield, Ill., assignors to Universal Oil Products Company, Chicago, Ill., a corporation of Delaware No Drawing. Application December 30, 1947, Serial No. 794,770

12 Claims. (Cl. 196—52)

This invention relates to improvements in the manufacture of catalytic composites of silica and metal oxides, and to the use of these catalysts in effecting hydrocarbon cracking reactions.

Catalytic composites of silica and metal oxides as, for example, silica-alumina, silica-magnesia, silica-alumina-magnesia, silica-zirconia, silica-alumina-zirconia, silica-thoria, silica-alumina-thoria, etc., are particularly suitable for effecting hydrocarbon cracking reactions.

These catalysts are especially desirable for use in the cracking of higher boiling oils, such as kerosene, gas oil, fuel oil, etc., to produce gasoline, including large amounts of olefinic gases which may be polymerized or otherwise utilized. The cracking reaction is generally effected at a temperature within the range of about 800° to about 1100° F. and at moderately superatmospheric pressures which generally are below about 50 pounds per square inch.

Satisfactory silica-metal oxide catalysts may be prepared by various methods involving separate precipitation, successive precipitation, co-precipitation, commingling of silica hydrogel with slurries of the metal oxide or metal hydroxide, etc. In conventional preparations the catalyst composite is usually finally washed, dried and calcined.

Recent investigations have been directed to methods of reducing the coke forming tendencies of the catalyst. The reduction in coke is extremely important from a commercial viewpoint, not only because the coke represents a loss of charging stock which otherwise would go to valuable products, but also because the coke must be burned from the catalyst and this entails expensive regenerating equipment. In addition, the formation of coke on the catalyst deactivates the catalyst and prevents its further use in effecting the desired catalytic cracking.

While it is expected that reducing the coke forming tendencies of the catalyst entails a reduction in catalytic activity to effect the cracking reaction, the recent investigations have also been directed to methods of controlling the reduction in catalyst activity so that it will not fall below that satisfactory for commercial use. As will be shown in the following examples, the reduction in coke forming tendencies of the improved catalysts of the present invention is much greater than the reduction in catalyst activity.

Still another important feature included in these investigations is the characteristics of the catalyst to produce normally gaseous products. In a process for the production of gasoline, it is of course important that the amount of normally gaseous products be kept to a minimum. As will be shown in the following examples, the improved catalysts of the present invention increase the ratio of gasoline to gas by about double.

In one embodiment the present invention relates to a method of preparing cracking catalysts which comprises compositing silica with a metal oxide, heating the composite at a temperature of from about 700° to about 1300° F. and thereafter treating the composite with ammonium hydroxide.

In a specific embodiment the present invention relates to a method of manufacturing a silica-alumina catalyst which comprises commingling an acid with an alkali metal silicate and dispersing the mixture in the form of droplets into a suspending medium under conditions to form silica hydrogel spheres, compositing said spheres with alumina, drying the composite at a temperature of from about 200° to about 500° F., calcining the composite at a temperature of from about 700° to about 1300° F., and thereafter treating the composite with an ammonium hydroxide solution.

In still another specific embodiment the present invention relates to a method of manufacturing a cracking catalyst which comprises commingling an acid with alkali metal silicate to form silica hydrogel washing the silica hydrogel to remove alkali metals, compositing alumina with said silica hydrogel, heating the composite at a temperature of from about 700° to about 1300° F., and thereafter treating the composite with an ammonium hydroxide solution.

In still another embodiment the present invention relates to the cracking of higher boiling oil to produce gasoline in the presence of catalysts formed in the manner herein set forth.

As hereinbefore set forth, the silica-metal oxide catalyst may be prepared in any suitable manner. In general, best catalysts are produced by forming silica hydrogel and subsequently compositing the metal oxide or metal oxides therewith. The silica hydrogel is conveniently prepared by reacting an alkali metal silicate and particularly commercial water glass with an acid such as hydrochloric acid, sulfuric acid, etc., under conditions to precipitate silica hydrogel. In general the amounts of water glass and acid are controlled to form a mixture having a pH within the range of from about 6 to about 8, which conditions will form silica hydrogel within a reasonable setting time. Silica hydrogel spheres are readily prepared by dispersing droplets of a mixture of acid and water glass at a pH within this range through a nozzle or from a rotating disk into a bath of oil or other water-immiscible suspending medium. Usually a layer of water is disposed beneath the oil bath and the water serves as a means of transporting the silica spheres from the forming zone. The silica spheres may be treated to remove alkali metals introduced through the use of water glass. The alkali metals are readily removed by washing the silica spheres with dilute acid solutions or by the use of ammonium compounds which serve to replace the alkali metal ions. When desired the silica spheres may then be washed with water.

Silica spheres formed in the above manner may be composited with another metal oxide in several methods. In one method, a suitable salt of the metal as, for example, aluminum sulfate, aluminum chloride, magnesium sulfate, magnesium chloride, zirconium sulfate, zirconium chloride, zirconium oxychloride, thorium sulfate, thorium chloride, etc., is commingled with the silica spheres and the corresponding oxide is precipitated by the addition of a suitable agent such as ammonium hydroxide, etc.

Another method of compositing the metal oxide with the silica spheres, is to commingle a slurry of the metal oxide as, for example, aluminum oxide, magnesium oxide, zirconium oxide, etc., with the silica spheres and stir the mass to insure intimate mixing of the oxides. The metal oxides may comprise naturally occurring materials or may be formed by separate precipitation by well known methods. In still another method of preparation, silica hydrogel-metal oxide catalysts may be formed by co-precipitation, in which method a suitable salt of the metal oxide or oxides is commingled with the water glass, and an acid or base, as required, is then added to precipitate the corresponding oxides.

The composite of silica and metal oxide is usually washed with water or water containing acidic or basic components. After washing, the catalyst may be treated in one of several methods. In one method of operation the catalyst is dried at a temperature of from about 200° to about 500° F. and then calcined at a temperature of from about 900° to about 1300° F. In some cases the drying and calcining operations are effected in a single continuous step and, although the temperature of the kiln or furnace is above about 1200° F., the catalyst actually undergoes drying at low temperatures until it reaches the higher temperature of calcination. In still another method of operation, the composite of silica and metal oxide may be slurried with water and the slurry subjected to spray drying at a temperature of about 700° F. In this method of operation the higher temperature calcination treatment may be omitted. The catalyst from the spray drying treatment is recovered in the form of spheres.

After the final heat treatment the internal structure of the catalyst is set. However, it is believed that the treatment with ammonium hydroxide in accordance with the present invention serves to increase the diameter of the pores and thereby to decrease the number of the pores. This effect serves to reduce the surface area.

As hereinbefore set forth, it is an essential feature of the present invention that the catalyst is subjected to high temperature heating prior to the treatment with ammonium hydroxide. The treatment with ammonium hydroxide may be effected in any suitable manner. A particularly suitable method is to suspend the catalyst in a solution of the ammonium hydroxide. This treatment may be effected at room temperature or at an elevated temperature which generally will not be above about 300° F. As will be shown in the following examples, either dilute or concentrated ammonium hydroxide solutions may be used. In general, the concentration of ammonium hydroxide will be within the range of from about 5 to about 28% by weight.

The improved catalysts of the present invention may be employed for effecting hydrocarbon cracking reactions in any suitable plant equipment, either of the fixed bed or moving catalyst bed type. In the fixed bed process the catalyst is deposited in one or more reaction zones, and the hydrocarbon to be cracked is passed therethrough at the desired temperature, pressure and time of contact. The moving bed types of processes include (1) the fluidized type process in which the hydrocarbon to be cracked or other suitable carrying medium is utilized to transport the catalyst into the reaction zone, wherein the reactants and catalyst are maintained in a state of turbulence under hindered settling conditions and wherefrom the catalyst is transferred by means of an oxygen-containing gas or other suitable medium into a regeneration zone wherein hydrocarbonaceous deposits are removed from the catalyst, (2) the moving catalyst bed type process in which the hydrocarbon to be cracked is passed either concurrently or countercurrently to a moving bed of catalyst, (3) the suspensoid type process in which the catalyst is carried as a slurry in the hydrocarbon to be cracked into the reaction zone, etc.

The following examples are introduced to illustrate further the novelty and utility of the present invention but not with the intention of unduly limiting the same.

A silica-alumina catalyst was prepared by commingling sulfuric acid with commercial water glass to produce silica hydrogel, washing to remove alkali metals, commingling aluminum sulfate with the silica hydrogel, adding ammonium hydroxide to precipitate alumina, filtering washing, forming a slurry of the composite and spray drying the same at a temperature of about 700° F. The silica-alumina composite was then suspended in an ammonium hydroxide solution and maintained at a temperature of about 195° F. for 24 hours, after which the catalyst was drained, dried at a temperature of about 250° F. and then calcined for 2 hours at a temperature of 1112° F. The ammonium hydroxide was used in aqueous solutions. The concentration of ammonium hydroxide in catalyst No. 2 was 28% by weight and the concentration in catalyst No. 3 was 7% by weight. For comparative purposes the results of catalysts prepared in substantially the same manner but without the ammonium hydroxide treatment are included as catalyst No. 1 in the following table. These results are as follows:

Table

| Catalyst No. | Concentration of Ammonium Hydroxide Solution | Conversion, Wt. Per Cent | Gasoline to Gas Ratio | Carbon Wt. Per Cent at 50% conversion | Area M²/gm. | Pore Diameter, A° |
|---|---|---|---|---|---|---|
| 1 | None | 32.3 | 2.1 | 1.72 | 625 | 35 |
| 2 | 28 | 18 | 4.5 | 0.46 | 192 | 121 |
| 3 | 7 | 19.7 | 3.6 | 0.56 | 209 | 113 |

It will be noted from the data in the above table that the catalyst treated in accordance with the present invention (catalysts No. 2 and No. 3) produced considerably less coke (0.46 and 0.56%) compared to catalyst No. 1 which was prepared without the ammonium hydroxide treatment (1.72% carbon). The carbon is reported on the basis of 50% conversion in order to compare the carbon forming tendencies of the catalyst on an equal basis.

It will be noted further that the gasoline to gas ratio for catalysts No. 2 and No. 3 are about double the ratio for catalyst No. 1. As hereinbefore set forth, the reduction in gas formation is of considerable importance.

It also will be noted that the pore diameter of catalysts No. 2 and No. 3 are considerably higher than the pore diameter of catalyst No. 1.

We claim as our invention:

1. The method of preparing a cracking catalyst which comprises compositing silica with a metal oxide, heating the composite at a temperature of from about 700° to about 1300° F., and thereafter suspending the composite in an aqueous solution of ammonium hydroxide at a temperature not in excess of about 300° F.

2. The method of preparing a cracking catalyst which comprises compositing silica gel with alumina, calcining the composite at a temperature of from about 700° to about 1300° F., and thereafter suspending the composite in an aqueous solution of ammonium hydroxide at a temperature not in excess of about 300° F.

3. A method of manufacturing a silica-metal oxide catalyst which comprises commingling an acid with an alkali metal silicate to produce silica hydrogel, compositing a metal oxide with the silica hydrogel, heating said composite at a temperature of from about 700° to about 1300° F., and thereafter suspending the composite in an aqueous solution of ammonium hydroxide at a temperature not in excess of about 300° F.

4. The process of claim 3 wherein said metal oxide comprises alumina.

5. The process of claim 3 wherein said metal oxide comprises magnesia.

6. The process of claim 3 wherein said metal oxide comprises zirconia.

7. A method of manufacturing a silica-alumina catalyst which comprises commingling an acid with an alkali metal silicate, washing the resultant silica hydrogel to remove alkali metal ions, commingling an aluminum salt therewith, precipitating alumina by adding a basic precipitant, forming a slurry of the silica-alumina composite in water and subjecting the slurry to spray drying to form catalyst spheres, and thereafter suspending said catalyst spheres in an aqueous solution of ammonium hydroxide at a temperature not in excess of about 300° F.

8. A method of manufacturing a silica-metal oxide catalyst which comprises commingling an acid with an alkali metal silicate and dispersing the mixture in the form of droplets into a suspending medium under conditions to form firm silica hydrogel spheres, compositing said spheres with a metal oxide, treating the composite to remove alkali metals, heating the composite to a temperature of from about 700° to about 1300° F., and thereafter suspending the composite in an aqueous solution of ammonium hydroxide at a temperature not in excess of about 300° F.

9. A process for the cracking of a hydrocarbon which comprises subjecting said hydrocarbon at cracking conditions to contact with a catalyst prepared by compositing silica with a metal oxide, heating the composite at a temperature of from about 700° to about 1300° F., and thereafter suspending the composite in an aqueous solution of ammonium hydroxide at a temperature not in excess of about 300° F.

10. A process for cracking of hydrocarbon oil which comprises subjecting said oil at cracking conditions to contact with a catalyst prepared by commingling an acid with an alkali metal silicate, washing the resultant silica hydrogel to remove alkali metal ions, commingling an aluminum salt therewith, precipitating alumina by adding a basic precipitant, forming a slurry of the silica-alumina composite in water and subjecting the slurry to spray drying to form catalyst spheres, and thereafter suspending said catalyst spheres in an aqueous solution of ammonium hydroxide at a temperature not in excess of about 300° F.

11. A process for cracking of hydrocarbon oil which comprises subjecting said oil at cracking conditions to contact with a catalyst prepared by commingling an acid with an alkali metal silicate and dispersing the mixture in the form of droplets into a suspending medium under conditions to form firm silica hydrogel spheres, compositing said spheres with a metal oxide, treating the composite to remove alkali metals, heating the composite to a temperature of from about 700° to about 1300° F., and thereafter suspending the composite in an aqueous solution of ammonium hydroxide at a temperature not in excess of about 300° F.

12. In the manufacture of catalysts wherein a mixture of silica hydrogel and a hydrous metal oxide is heated to form dried catalyst particles, the method of improving the catalyst which comprises suspending said dried particles in an aqueous solution of ammonium hydroxide at a temperature not in excess of about 300° F.

GLENN M. WEBB.
RENO W. MOEHL.

REFERENCES CITED

The following references are of record in the file of this patent:

UNITED STATES PATENTS

| Number | Name | Date |
|---|---|---|
| 2,285,314 | Thomas et al. | June 2, 1942 |
| 2,384,943 | Marisic | Sept. 18, 1945 |
| 2,412,868 | Brown | Dec. 17, 1946 |
| 2,435,379 | Archibald | Feb. 3, 1948 |